United States Patent
Liu et al.

(10) Patent No.: US 11,519,599 B2
(45) Date of Patent: Dec. 6, 2022

(54) OPPOSED-INJECTION ALUMINUM MELTING FURNACE UNIFORM COMBUSTION SYSTEM

(71) Applicant: GUANGDONG UNIVERSITY OF TECHNOLOGY, Guangzhou (CN)

(72) Inventors: Xiaozhou Liu, Guangzhou (CN); Yu Zhang, Guangzhou (CN); Wenxing Liu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 426 days.

(21) Appl. No.: 16/761,774

(22) PCT Filed: Nov. 8, 2017

(86) PCT No.: PCT/CN2017/109924
§ 371 (c)(1),
(2) Date: May 5, 2020

(87) PCT Pub. No.: WO2019/090510
PCT Pub. Date: May 16, 2019

(65) Prior Publication Data
US 2021/0180786 A1 Jun. 17, 2021

(51) Int. Cl.
*F23L 15/02* (2006.01)
*F23C 5/28* (2006.01)
(Continued)

(52) U.S. Cl.
CPC .................. *F23C 5/28* (2013.01); *F23K 3/02* (2013.01); *F23L 15/02* (2013.01); *F27D 17/00* (2013.01); *F23C 2700/02* (2013.01)

(58) Field of Classification Search
CPC ........ F23G 7/068; F27D 17/00; F27D 17/004; F23L 15/02; F23C 5/28; C22B 21/00; Y02P 40/50
See application file for complete search history.

(56) References Cited

U.S. PATENT DOCUMENTS 1,790,172 A * 1/1931 Smith ..................... F27B 3/002
432/28
1,943,957 A * 1/1934 Godard .................. F27B 3/002
432/181
(Continued)

FOREIGN PATENT DOCUMENTS

CN 101392957 A 3/2009
CN 102564127 A 7/2012
(Continued)

OTHER PUBLICATIONS

International Search Report dated Jul. 31, 2018, issued to International Application No. PCT/CN2017/109924.

*Primary Examiner* — Gregory A Wilson
(74) *Attorney, Agent, or Firm* — Stein IP, LLC

(57) ABSTRACT

The invention discloses an opposed-injection aluminum melting furnace uniform combustion system which comprises: a furnace body, a first heat storage unit, a second heat storage unit, and four fuel injection guns disposed diagonally on two end walls of the furnace body comprising a first fuel injection gun located on the first end wall of the furnace body adjacent to the second heat storage unit, a second fuel injection gun located on the second end wall of the furnace body adjacent to the first heat storage unit, a third fuel injection gun on the second end wall of the furnace body adjacent to the second heat storage unit, and a fourth fuel injection gun located on the first end wall of the furnace body adjacent to the first heat storage unit, the gas injection direction of the first fuel injection gun is parallel with that of the second fuel injection gun with a spacing H between the axes thereof, the gas injection direction of the third fuel injection gun is parallel with that of the fourth fuel injection gun, with a spacing H between the axes thereof, and the spacing H between the axes is set to a quarter to one tenth (Continued)

of the furnace body width, such that the gas entering the chamber are oppositely-injected to form a swirling flow.

9 Claims, 2 Drawing Sheets

(51) Int. Cl.
*F23K 3/02* (2006.01)
*F27D 17/00* (2006.01)

(56) References Cited

U.S. PATENT DOCUMENTS

| | | | |
|---|---|---|---|
| 2,017,480 A | 10/1935 | Tonnar | |
| 3,387,574 A | 6/1968 | Mullen | |
| 4,818,844 A * | 4/1989 | Ward | C03B 29/08 |
| | | | 266/139 |
| 6,748,883 B2 * | 6/2004 | Solis-Martinez | F23K 3/02 |
| | | | 110/101 CC |
| 2011/0294082 A1 * | 12/2011 | Distergeft | F23L 15/02 |
| | | | 431/2 |
| 2021/0180786 A1 * | 6/2021 | Liu | F23L 15/02 |

FOREIGN PATENT DOCUMENTS

| | | | |
|---|---|---|---|
| CN | 204345635 U | | 5/2015 |
| CN | 204690029 U | | 10/2015 |
| EP | 0019007 A1 | * | 11/1980 |
| EP | 3073194 A1 | | 9/2016 |
| EP | 3173696 A1 | | 5/2017 |
| GB | 748322 A | | 4/1956 |

* cited by examiner

OPPOSED-INJECTION ALUMINUM MELTING FURNACE UNIFORM COMBUSTION SYSTEM

CROSS-REFERENCE TO RELATED APPLICATIONS

This application is a national stage of International Application No. PCT/CN2017/109924, filed Nov. 8, 2017 in the State Intellectual Property Office of China, the disclosure of which is incorporated herein by reference.

TECHNICAL FIELD

The present disclosure generally relates to an aluminum melting furnace, in particular an aluminum melting furnace uniform combustion system.

BACKGROUND

In recent years, aluminum melting furnaces have been widely used as a new industrial furnace for melting metals. However, in melting process, several problems may occur, for example, energy waste, environmental pollution and poor working conditions caused by imperfect recovery systems; discontinuous producing procedure, low production efficiency and poor working conditions caused by unreasonable equipment design; as well as uneven heating and poor product quality caused by improper combustor design and oversize furnace capacity.

Chinese Patent No. 201420527169.8 discloses a large-scale aluminum melting furnace opposed-injection regenerative combustion type combustion system, which comprises: a furnace body provided with a chamber for releasing combustion heat; and two fuel injection guns that are symmetrically installed on two end walls of the furnace body. On both end walls of the furnace body, an inlet and an outlet are provided on two sides of each fuel injection gun respectively. The system further includes four heat storage units, each of which comprises a cold air inlet, a hot air outlet, a high-temperature flue gas inlet and a low-temperature flue gas outlet, wherein the hot air outlet and the high-temperature flue gas inlet of each heat storage unit are connected with the gas inlet and the gas outlet beside one of the fuel injection guns through a pipe, the cold air inlet of each heat storage unit is connected with an air source through a duct, and the low-temperature flue gas outlet of each heat storage unit is connected with the chimney through a duct; and control valves which are disposed in each duct for controlling each heat storage unit to switch between heat storing state and heat releasing state. However, is such system, the gas is not preheated before entering the chamber, causing temperature fluctuation and insufficient mix of gas and air, which easily causes so-called incomplete combustion.

As another example, Chinese Patent Application No. 201210390169.3 disclosed a burnout-wind arrangement in an opposed-injection front and rear walls combustion boiler. The boiler utilizes opposed-injection front and rear wall combustion type, wherein the burnout-wind is fed along tangential circle route. The opposed-injection front and rear walls combustion boiler includes opposed-injection front and rear walls combustion boiler and the burnout-wind is divided into two groups by the symmetrical center line of the boiler length, with 4-5 burnout-wind nozzles provided for each group. The center line of burnout-wind emitted by each group of burnout-wind nozzles is tangent with the same hypothesis ellipse, with the opposite clockwise and counterclockwise rotating direction for each ellipse. The burnout-wind is high-speed direct-flow type burnout-wind, and the burnout-wind nozzles swing in all dimensions including up-down and left-right. However, such burnout-wind arrangement in the opposed-injection front and rear walls combustion boiler is designed for burnout-wind, that is to say, a certain amount of air is supplied into the burnout area to enhance the mixing of burnout-wind and rising flue gas, thus increasing the flue gas stroke and the stay time of the fuel in the furnace. However, the application does not disclose how the fuel injection angle is adjusted, neither does it involve waste heat recycling system, thus may causing potential energy waste and environmental pollution.

Therefore, there is an urgent need for an opposed-injection aluminum melting furnace combustion system with uniform flue gas flow in the industry that is energy-saving, environmentally-friendly, and high-efficient.

BRIEF SUMMARY

An opposed-injection aluminum melting furnace uniform combustion system that is energy-saving, environmentally-friendly, and high-efficient is provided in the invention to achieve uniform combustion in the chamber of the furnace.

To this end, an opposed-injection aluminum melting furnace uniform combustion system is provided in this invention that includes furnace body having a chamber for combustion heat release; a first heat storage unit that is located on one side of the furnace body comprising a first port disposed at the innermost side of the first heat storage unit and connected with the chamber, a second port disposed at the outermost side of the first heat storage unit, and at least two third ports; a second heat storage unit, the second heat storage unit is located on the other side of the furnace body comprising a first port disposed at the innermost side of the second heat storage unit and connected with the chamber, a second port disposed at the outermost side of the second heat storage unit, and at least two third ports; the second port of the first heat storage unit and the second port of the second heat storage unit are respectively connected to a chimney through pipes, the at least two third ports of the first heat storage unit and the at least two third ports of the second heat storage unit are respectively connected to an air source through pipes; and four fuel injection guns, wherein the four fuel injection guns are disposed diagonally on two end walls of the furnace body, the four fuel injection guns include a first fuel injection gun located on the first end wall of the furnace body adjacent to the second heat storage unit, a second fuel injection gun located on the second end wall of the furnace body adjacent to the first heat storage unit, a third fuel injection gun located on the second end wall of the furnace body adjacent the second heat storage unit, and a fourth fuel injection gun located on the first end wall of the furnace body adjacent to the first heat storage unit side. The gas injection direction of the first fuel injection gun is parallel with that of the second fuel injection gun with a spacing H between the axes thereof, and the gas injection direction of the third fuel injection gun is parallel with that of the fourth fuel injection gun with a spacing H between the axes thereof, the spacing H between the axes is set to one quarter to one tenth of the furnace body width, such that the gases entering the chamber are injected in opposite direction to form a swirling flow; control valves are provided on the at least two third ports of the first heat storage unit, and the at least two third ports of the second heat storage units, an inlet of the first fuel injection gun, an inlet of the second fuel injection gun, an inlet of the third fuel injection gun, and an inlet of the fourth fuel injection gun, to realize the switching between heat releasing state and heat storing state of the first heat storage unit and the second heat storage unit.

Alternatively, the control valve could be electric switch valve or solenoid valve.

Preferably, the axis of the first fuel injection gun, the axis of the second fuel injection gun, the axis of the third fuel spray and the axis of the fourth fuel injection gun are located on the same plane.

Optionally, when the first heat storage unit works under the heat storing state, the first port of the first heat storage unit serves as a high-temperature flue gas inlet, the second port of the first heat storage unit serves as a low-temperature flue gas outlet, and the at least two third ports of the first heat storage unit are closed; the second heat storage unit works under the heat releasing state, the at least two third ports of the second heat storage unit serve as the low-temperature air inlet, the first port of the second heat storage unit serves as the high-temperature air outlet, and the second port of the second heat storage unit is closed; the first fuel injection gun and the second fuel injection gun inject gas into the chamber, and the third fuel injection gun and the fourth fuel injection gun are in the closed state.

Optionally, when the first heat storage unit works under the heat releasing state, the at least two third ports of the first heat storage unit serve as low-temperature air inlets, the first port of the first heat storage unit serves as a high temperature air outlet, and the second port of the first heat storage unit is closed; the second heat storage unit works under the heat storing state, the first port of the second heat storage unit serves as a high-temperature flue gas inlet, the second port of the second heat storage unit serves as a low-temperature flue gas outlet, and the at least two third ports of the second heat storage unit are closed; the third fuel injection gun and the fourth fuel injection gun inject gas into the chamber, and the first fuel injection gun and the second fuel injection gun are in the closed state.

Optionally, an air distribution panel is disposed at a first distance from one side wall of the chamber and a first distance from the other side wall of the chamber, and the first distance is set to one tenth to one fifth of the chamber width.

Optionally, a row of center holes is provided along the longitudinal center line of the air distribution panel, with the row of center holes including at least six square holes; several rows of circular holes are disposed along the lateral direction of the air distribution panel from the row of center holes to both side edges, with each row of circular holes including at least six circular holes along the longitudinal direction of the air distribution panel.

Optionally, each row of circular holes is alternately arranged with the adjacent row of circular holes in lateral direction, the row of center holes is alternately arranged with the adjacent two rows of circular holes in lateral direction.

Optionally, the first heat storage unit includes: a first heat storage device, a second heat storage device, an air distribution chamber, and a heat exchange device arranged in sequence from inside to outside, wherein the first heat storage device of the first heat storage unit, the second heat storage device of the first heat storage unit, and the gas distribution chamber of the first heat storage unit are sequentially connected, and at least two air passages connecting with the at least two third ports of the first heat storage unit are provided on the outer side wall of the air distribution chamber of the first heat storage unit, a heat exchange chamber and a collection chamber are provided in the heat exchange device of the first heat storage unit from inside out, at least three first flue gas passages connecting with the inner side wall of the heat exchange chamber of the first heat storage unit are provided on the outer side wall of the air distribution chamber of the first heat storage unit, at least three second flue gas passages connecting with the inner side wall of the collection chamber of the first heat storage unit are provided on the outer side wall of the heat exchange chamber of the first heat storage unit and a third flue gas passage connecting with the second port of the first heat storage unit is provided on the outer side wall of the collection chamber of the first heat storage unit; the second heat storage unit includes: a first heat storage device, a second heat storage device, an air distribution chamber, and a heat exchange device arranged in sequence from inside out, wherein the first heat storage device of the second heat storage unit, the second heat storage device of the second heat storage unit, and the air distribution chamber of the second heat storage unit are sequentially connected, and at least two air passages connecting with the at least two third ports of the second heat storage unit are provided on the outer side wall of the air distribution chamber of the second heat storage unit, a heat exchange chamber and a collection chamber are provided in the heat exchange device of the second heat storage unit from inside out, at least three first flue gas passages connecting with the inner side wall of the heat exchange chamber of the second heat storage unit are provided on the outer side wall of the air distribution chamber of the second heat storage unit, at least three second flue gas passages connecting with the inner side wall of the collection chamber of the second heat storage unit are provided on the outer side wall of the heat exchange chamber of the second heat storage unit, and a third flue gas passage connecting with the second port of the second heat storage unit is provided on the outer side wall of the collection chamber of the second heat storage unit.

Preferably, the first heat storage device of the first heat storage unit and the first heat storage device of the second heat storage unit are filled with ceramic balls, and the second heat storage device of the first heat storage unit and the second heat storage device of the second heat storage unit are filled with honeycomb-like ceramic heat storage body.

Preferably, the air distribution chamber of the first heat storage unit and the air distribution chamber of the second heat storage unit are cavities.

Optionally, a first gas pipeline that passes transversely through the inner cavity of the heat exchange chamber is provided in the heat exchange chamber of the heat exchange device of the first heat storage unit, a second gas pipeline that passes transversely through the inner cavity of the heat exchange chamber is provided in the heat exchange chamber of the heat exchange device of the second heat storage unit, the two ends of the first gas pipeline are disposed with a first inlet port and a first outlet port, the two ends of the second gas pipeline are disposed with a second inlet port and a second outlet port, the first inlet port and the second inlet port are provided with control valves, and the first outlet ports are connected with the inlet of the first fuel injection gun and the inlet of the second fuel injection gun through pipes, and the second outlet ports are connected with the inlet of the third fuel injection gun and the inlet of the fourth fuel injection gun through pipes.

Optionally, the first gas pipeline includes at least three first gas branch pipes, the first gas branch pipe of each first gas pipeline is connected with the first inlet port of the first gas pipeline and the first outlet port of the first gas pipeline on two ends; the second gas pipeline includes at least three second gas branch pipes, the second gas branch pipe of each second gas pipeline is connected with the second inlet port of the second gas pipeline and the second outlet port of the second gas pipeline on two ends.

Optionally, the outlet of the first fuel injection gun and the outlet of the third fuel injection gun are inclined at the same angle with respect to the longitudinal axis of the furnace body, and the outlet of the second fuel injection gun and the outlet of the fourth fuel injection gun are inclined at the same angle with respect to the longitudinal axis of the furnace body.

Preferably, the angle formed between the outlet of the first spray gun and the longitudinal axis of the furnace body is set between 15° and 45°, and the angle formed between the outlet of the second spray gun and the longitudinal axis of the furnace body is set between 15° and 45°.

Optionally, the first fuel injection gun, the second fuel injection gun, the third fuel injection gun, and the fourth fuel injection gun all inject liquefied petroleum gas or natural gas into the chamber.

Wherein, in describing the first or second heat storage unit of the present invention, the expression of "inside" or "outside" are made with respect to the furnace body, with "inside" referring to being close to the furnace body and "outside" being away from the furnace body.

The beneficial effects presented in the present invention include: a. By arranging the fuel injection guns diagonally, a swirling flow could be formed from the gas injected into the furnace body of the aluminum melting furnace, then mixing the resulting swirling gas with the preheated air of the heat storage unit disposed on two sides of the aluminum melting furnace, and combusting the mixed gas, the flame will be able to fill the entire furnace body, thus heating the furnace body more quickly and evenly, which is particularly suitable for large-scale furnace body; b. By arranging two heat storage units on two sides of the aluminum melting furnace, heat energy can be utilized more effectively and therefore reduce wastes; c. The heat storage unit adopts a combined structure, which makes full use of the exhaust flue gas heat. Gas could be preheated in the heat exchange chamber of the heat exchange device of the heat storage unit, and when being injected into the high-temperature chamber, the preheated gas will not cause significant temperature fluctuation in the chamber. Therefore, the temperature inside the chamber is more stable and the combustion is more efficient.

DETAILED DESCRIPTION

Embodiments of the present invention are described in detail below, examples of which are illustrated in the accompanying drawings. Wherein the same or similar reference numbers are used throughout the description to indicate the same or similar elements or elements with same or similar function. The embodiments described below with reference to the drawings are merely exemplary, and therefore shall not to be construed as limiting the invention.

Figure 1:
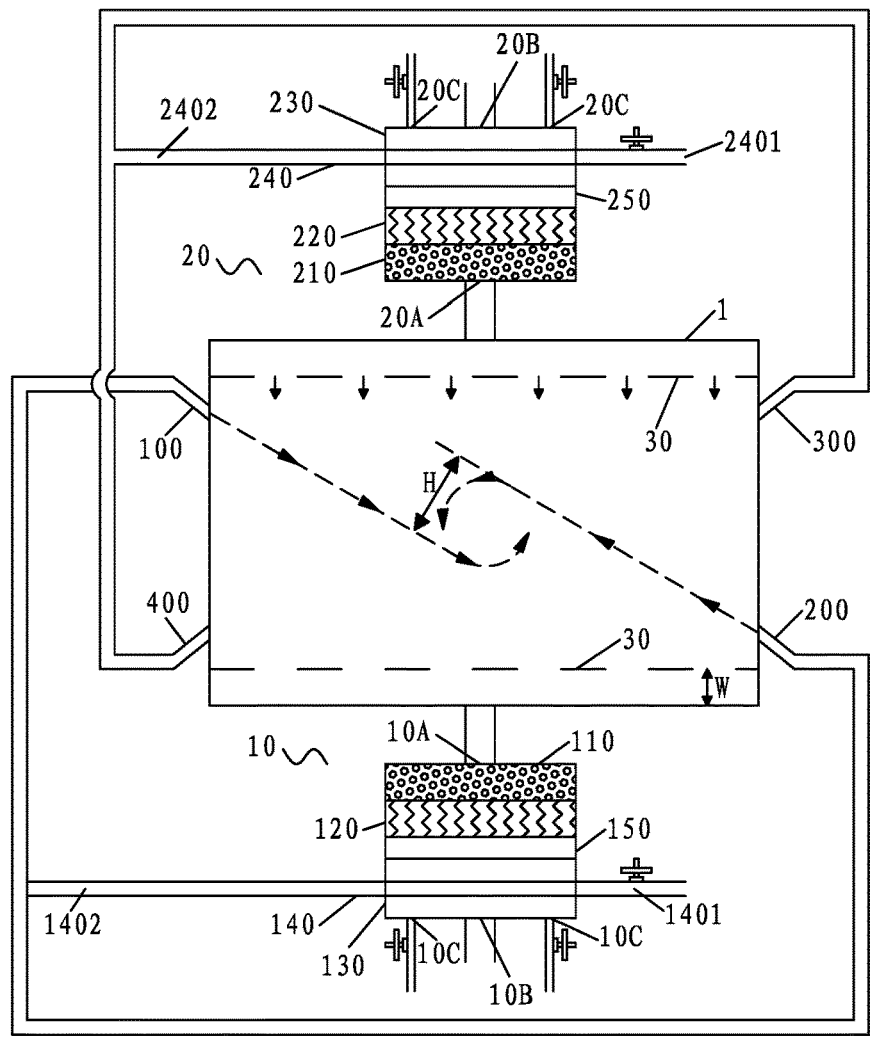
FIG. 1 is an illustrative construction diagram showing an embodiment of the opposed-injection aluminum melting furnace uniform combustion system of the present invention.

Referring to FIG. 1, as a non-limiting embodiment, the opposed-injection aluminum melting furnace uniform combustion system of the present invention comprises: a furnace body 1, a first heat storage unit 10, a second heat storage unit 20, a first fuel injection gun 100, a second fuel injection gun 200, a third fuel injection gun 300, and a fourth fuel injection gun 400.

The first heat storage unit 10 is located on one side of the furnace body 1 and includes: a first port 10A, a second port 10B and two third ports 100. Wherein the first port 10A is located in the innermost side of the first heat storage unit 10 and is connected to the furnace 1 through a pipe, and the second port 10B is located in the middle part of the outermost side wall of the first heat storage unit 10 and is connected to the chimney (not shown) through a pipe. The two third ports 100 are respectively disposed on two sides of the outermost side wall of the first heat storage unit 10 and are connected to the air source (not shown) through pipes.

Symmetrically, the second heat storage unit 20 is located on the other side of the furnace body 1 and includes: a first port 20A, a second port 20B and two third ports 20C. Wherein the first port 20A is located in the innermost side of the second heat storage unit 20 and is connected to the furnace 1 through a pipe, and the second port 20B is located on the middle part of the outermost side wall of the second heat storage unit 20 and is connected to the chimney (not shown) through a pipe. The two third ports 20C are respectively disposed on two sides of the outermost side wall of the second heat storage unit 20 and are connected to the air source (not shown) through pipes.

The first fuel injection gun 100 is located on the first end wall of the furnace body 1 adjacent to the second heat storage unit 20, the second fuel injection gun 200 is located on the second end wall of the furnace body 1 adjacent to the first heat storage unit 10, the third fuel injection gun 300 is located on the second end wall of the furnace body 1 adjacent to the second heat storage unit 20 and the fourth fuel injection gun 400 is located on the first end wall of the furnace body 1 adjacent to the first heat storage unit 10.

As shown in FIG. 1, the gas injection direction of the first fuel injection gun 100 (as shown by the dashed line in FIG. 1) is parallel with that of the second fuel injection gun 200 (shown by the dashed line in FIG. 1), with a spacing H between the axes. Similarly, the gas injection direction of the third fuel injection gun 300 is parallel with that of the fourth fuel injection gun 400, with a spacing H between the axes. In this non-limiting embodiment, the spacing H between the axes is set to one sixth of the width of the furnace body, whereby, as indicated by the dashed line in FIG. 1, the gas is oppositely injected into the chamber by two diagonally disposed fuel injection guns (the first fuel injection gun 100 and the second fuel injection gun 200 inject flow oppositely, or the third fuel injection gun 300 and the fourth fuel injection gun 400 inject flow oppositely). Since the parallel arrangement with a certain axial spacing, the two gas flows form a swirling from their opposed injecting. Therefore, the resulting swirling gas will mix with the air from one side of the chamber more evenly, ensuring that the combustion flame will fill the entire chamber and heats the chamber more quickly and evenly.

In this non-limiting embodiment, the outlets of the first fuel injection gun 100 and the third fuel injection gun 300 are inclined at an angle of about 30° with respect to the longitudinal axis of the furnace body, and the outlets of the second fuel injection gun 200 and the fourth fuel injection gun 400 are also inclined at an angle of about 30° with respect to the longitudinal axis of the furnace body, making the furnace body filled with flame more efficiently.

In this embodiment, the first heat storage unit 10 and the second heat storage unit 20 located on two sides of the furnace body 1 switch between heat storing state and heat releasing state. In operation, when the second heat storage unit 20 works under heat releasing state, the solenoid valves that control the two third ports 20C of the second heat storage unit 20 are open, and the two third ports 20C serve as low-temperature air inlets. After low-temperature air being pre-heated in the second heat storage unit 20, the pre-heated air enters the furnace body 1 through the first port 20A that serves as a high-temperature air outlet. Meanwhile, the solenoid valve that controls the second port 20B of the second heat storage unit 20 is closed. At the same time, gas is injected into the chamber by the first fuel injection gun 100 and the second fuel injection gun 200, and is mixed with the high-temperature air preheated by the second heat storage unit 20 to perform combustion heat release. The third fuel injection gun 300 and the fourth fuel injection gun 400 are closed by the solenoid valves. The high-temperature flue gas generated by combustion enters into the first heat storage unit 10 through the first port 10A of the first heat storage unit 10. Meanwhile, the first heat storage unit 10 works under heat storing state, the first port 10A of the first heat storage unit 10 serves as a high-temperature flue gas inlet, the second port 10B of the first heat storage unit 10 serves as a low-temperature flue gas outlet, and the two third ports 100 of the first heat storage unit 10 are closed by the solenoid valves.

When the first heat storage unit 10 works under heat releasing state after heat storage completed, the solenoid valves that control the two third ports 10C of the first heat storage unit 10 are open and the two third ports 100 serve as low-temperature air inlets. After the low-temperature air being preheated in the first heat storage unit 10, the pre-heated air enters into the furnace body 1 through the first port 10A that servers as a high-temperature air outlet. Meanwhile, the solenoid valve that controls the second port 10B of the first heat storage unit 10 is closed. At the same time, gas is injected into the chamber by the third fuel injection gun 300 and the fourth fuel injection gun 400 and is mixed with the high-temperature air preheated by the first heat storage unit 10 to perform combustion heat release. The first fuel injection gun 100 and the second fuel injection gun 200 are closed by the solenoid valves. The high-temperature flue gas generated by combustion enters into the second heat storage unit 20 through the first port 20A of the second heat storage unit 20. Meanwhile, the second heat storage unit 20 works under heat storing state, the first port 20A of the second heat storage unit 20 serves as a high-temperature flue gas inlet, the second port 20B of the second heat storage unit 20 serves as a low-temperature flue gas outlet, and the two third ports 20C of the second heat storage unit 20 are closed by the solenoid valves.

Figure 2:
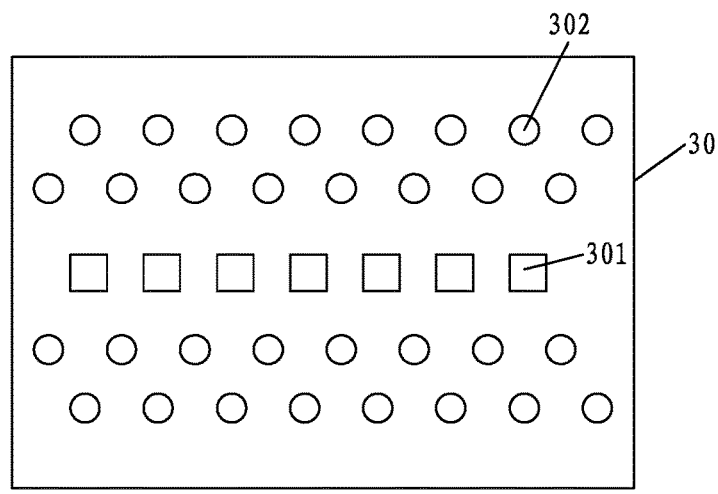
FIG. 2 is an illustrative construction diagram showing the air distribution panel of the present invention.

As an alternative embodiment, as shown in FIG. 1, an air distribution panel 30 is disposed with a first distance W from the two side walls of the chamber, and the first distance W is set to be one eighth of the width of the chamber. As shown in FIG. 2, a row of center holes including seven square holes 301 is arranged along the longitudinal center line of the air distribution panel 30. Two rows of circular holes are arranged along the lateral direction of the air distribution panel 30 starting from the center holes 301 to both side edges respectively and each row of circular holes includes 7 circular holes 302 which are sequentially arranged along the longitudinal direction of the air distribution penal. Each row of circular holes 302 is respectively alternated with the adjacent row of circular holes 302 in lateral direction, and the central holes 301 is also respectively alternated with the adjacent two rows of circular holes 302 in lateral direction, thereby facilitating the mix of high-temperature air preheated by the first heat storage device 10 or the second heat storage device 20 with the swirling gas more uniform.

In this non-limiting embodiment, as shown in FIG. 1, the first heat storage unit 10 includes: a first heat storage device 110 filled with ceramic balls, a second heat storage device 120 filled with a honeycomb-like ceramic heat storage body, an air distribution chamber 150 and a heat exchange device 130. Symmetrically, the second heat storage unit 20 includes: a first heat storage device 210 filled with ceramic balls, a second heat storage device 220 filled with honeycomb-like ceramic heat storage body, an air distribution chamber 250 and a heat exchange device 230.

Figure 3:
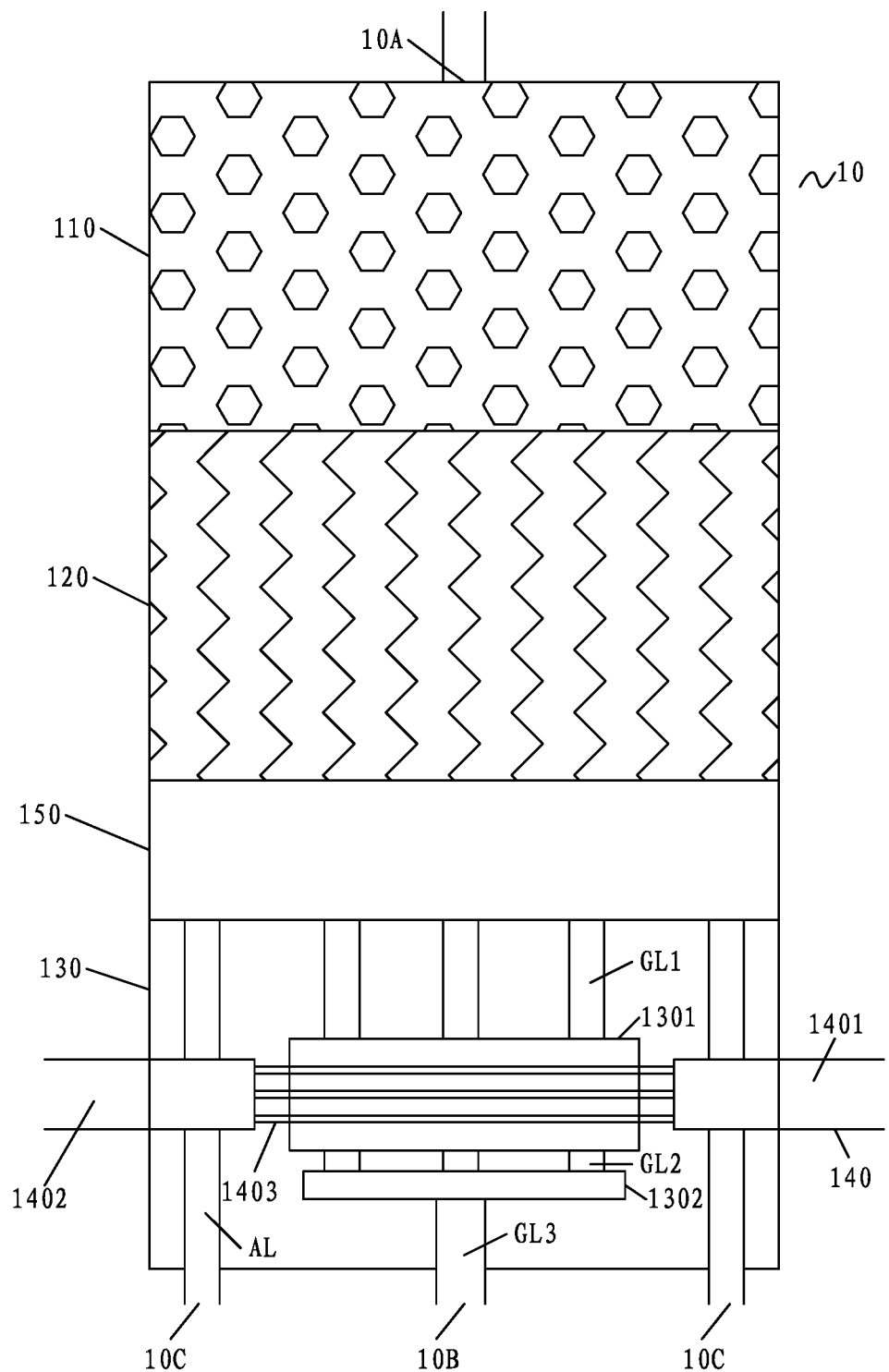
FIG. 3 is an illustrative construction diagram showing the first heat storage unit of the present invention.

As another alternative embodiment, as shown in FIG. 3, taking the first heat storage unit 10 as example, the first heat storage device 110, the second heat storage device 120 and the air distribution chamber 150 are sequentially connected, and two air channels AL respectively connected with the third ports 100 are provided on the two sides of the outer side wall of the air distribution chamber 150. The heat exchange device 130 is provided with a heat exchange chamber 1301 and a collection chamber 1302 from the inside out direction. Three first flue gas channels GL1 are provided at the center of the outer side wall of the air distribution chamber 150 which are connected with the inner side wall of the heat exchange chambers 1301, three second flue gas channels GL2 are provided on the outer side wall of the heat exchange chamber 1301 which are connected with the inner side wall of the collection chamber 1302 and a third flue gas channel GL3 is provided on the outer side wall of the collection chamber 1302 which is connected with the second port 10B.

In order to make better use of the waste heat of the discharged high-temperature flue gas while ensuring the temperature inside the furnace, a first gas pipeline 140 transversely passing through the inner chamber of the heat exchange device 130 is provided in the heat exchange device 130 of the first heat storage unit 10, with a first inlet port 1401 and a first outlet port 1402 provided on two ends of the first gas pipeline 140. The first gas pipeline 140 includes three first gas branch pipes 1403, with two ends of each first gas branch pipe 1403 connected to the first inlet port 1401 and the first outlet port 1402 respectively. As shown in FIG. 1, a control valve is disposed at the first inlet port 1401. The first outlet port 1402 is connected to the inlet of the first fuel injection gun 100 and the inlet of the second fuel injection gun 200 respectively through pipes, thereby preheating the air for combustion by the waste heat of the high-temperature flue gas.

Similarly, a second gas pipeline 240 transversely passing through the inner chamber of the heat exchange device 230 is provided in the heat exchange device 230 of the second heat storage unit 20, with a second inlet port 2401 and a second outlet port 2402 provided on two ends of the second gas pipeline 240. A control valve is disposed at the second inlet port 2401. The second outlet port 1402 is connected to the inlet of the third fuel injection gun 300 and the inlet of the fourth fuel injection gun 400 respectively through pipes. Likewise, the second gas pipeline includes at least three second gas branch pipes, with two ends of each second gas branch pipe connected to the second inlet port and the second outlet port respectively.

Thus, when the first heat storage unit 10 works under heat storing state, the first port 10A of the first heat storage unit 10 serves as a high-temperature flue gas inlet. After the high-temperature flue gas passing through the first heat storage device 110 and the second heat storage device 120 in sequence, heat will be accumulated in the heat storage body in the first heat storage device 110 and the second heat storage device 120. And then the flue gas enters the air distribution chamber 150 and enters into the heat exchange chamber 1301 along the three first flue gas channels GL1, exchanging heat with the gas in the first gas branch pipe 1403 crossing the inner cavity of the heat exchange chamber 1301. The resulting low-temperature flue gas enters into the collection chamber 1302 along the three second flue gas channels GL2 and is discharged to the chimney through the second port 10B along the third flue gas channel GL3. At this time, the solenoid valves that control the two third ports 100 of the first heat storage unit 10 are closed.

When the first heat storage unit 10 works under heat releasing state, the solenoid valves that control the two third ports 100 of the first heat storage unit 10 are open. Low-temperature air enters into the air distribution chamber 150 from the two third ports 100 along the air channel AL and then enters into the second heat storage device 120 and the first heat storage device 110 in which the low-temperature air is preheated to form high-temperature air, entering the furnace body 1 from the first port 10A.

In the description of this specification, such reference terms as "one embodiment", "some embodiments", "examples", "specific example", or "some examples" and the like are intended to indicated that the specific features, structures, or characteristics described in combine with such embodiments or the examples shall be included in at least one embodiment or example of the invention. In this specification, the schematic representation of the above terms does not have to be directed to the same embodiment or example. Moreover, without contradicting with each other, those skilled in the art shall be able to combine the different embodiments or examples as well as features of different embodiments or examples described in this specification.

The invention claimed is:

1. An opposed-injection aluminum melting furnace uniform combustion system, comprises:
   a furnace body having a chamber for combustion heat release;
   a first heat storage unit, the first heat storage unit is located on one side of the furnace body and includes: a first port disposed at the innermost side of the first heat storage unit and connected with the chamber, a second port disposed at the outermost side of the first heat storage unit, and at least two third ports;
   a second heat storage unit, the second heat storage unit is located on the other side of the furnace body and includes: a first port disposed at the innermost side of the second heat storage unit and connected with the chamber, a second port disposed at the outermost side of the second heat storage unit, and at least two third ports;
   the second port of the first heat storage unit and the second port of the second heat storage unit are respectively connected to a chimney through pipes, the at least two third ports of the first heat storage unit and the at least two third ports of the second heat storage unit are respectively connected to an air source through pipes; and
   four fuel injection guns;
   wherein the four fuel injection guns are disposed diagonally on two end walls of the furnace body, wherein the four fuel injection guns include a first fuel injection gun located on the first end wall of the furnace body adjacent to the second heat storage unit, a second fuel injection gun located on the second end wall of the furnace body adjacent to the first heat storage unit, a third fuel injection gun located on the second end wall of the furnace body adjacent to the second heat storage unit, and a fourth fuel injection gun located on the first end wall of the furnace body adjacent to the first heat storage unit,
   wherein, the gas injection direction of the first fuel injection gun is parallel with that of the second fuel injection gun, with a spacing H between the axes thereof, and the gas injection direction of the third fuel injection gun is parallel with that of the fourth fuel injection gun, with a spacing H between the axes thereof, the spacing H between the axes is set to one fourth to one tenth of the width of the furnace body, such that the gas entering the chamber are oppositely injected to form a swirling flow;
   a plurality of control valves are provided on the at least two third ports of the first heat storage unit, the at least two third ports of the second heat storage unit, an inlet of the first fuel injection gun, an inlet of the second fuel injection gun, an inlet of the third fuel injection gun, and an inlet of the fourth fuel injection gun to realize the switching between heat releasing state and heat storing state of the first heat storage unit and the second heat storage unit alternately; and
   wherein, the first heat storage unit includes: a first heat storage device, a second heat storage device, an air distribution chamber, and a heat exchange device arranged in sequence from inside out, wherein the first heat storage device of the first heat storage unit, the second heat storage device of the first heat storage unit, and the gas distribution chamber of the first heat storage unit are sequentially connected, and at least two air passages connecting with the at least two third ports of the first heat storage unit are provided on the outer side wall of the air distribution chamber of the first heat storage unit, a heat exchange chamber and a collection chamber are provided in the heat exchange device of the first heat storage unit from inside out, at least three first flue gas passages connecting with the inner side wall of the heat exchange chamber of the first heat storage unit are provided on the outer side wall of the air distribution chamber of the first heat storage unit, at least three second flue gas passages connecting with the inner side wall of the collection chamber of the first heat storage unit are provided on the outer side wall of the heat exchange chamber of the first heat storage unit and the third flue gas passage connecting with the second port of the first heat storage unit is provided on the outer side wall of the collection chamber of the first heat storage unit;
   the second heat storage unit includes: a first heat storage device, a second heat storage device, an air distribution chamber, and a heat exchange device arranged in sequence from inside out, wherein the first heat storage device of the second heat storage unit, the second heat storage device of the second heat storage unit, and the air distribution chamber of the second heat storage unit are sequentially connected, and at least two air passages connecting with the at least two third ports of the second heat storage unit are provided on the outer side wall of the air distribution chamber of the second heat storage unit, a heat exchange chamber and a collection chamber are provided in the heat exchange device of the second heat storage unit from inside out, at least three first flue gas passages connecting with the inner side wall of the heat exchange chamber of the second heat storage unit are provided on the outer side wall of the air distribution chamber of the second heat storage unit, at least three second flue gas passages connecting with the inner side wall of the collection chamber of the second heat storage unit are provided on the outer side wall of the heat exchange chamber of the second heat storage unit, and a third flue gas passage connecting with the second port of the second heat storage unit is provided on the outer side wall of the collection chamber of the second heat storage unit.

2. The opposed-injection aluminum melting furnace uniform combustion system according to claim 1, wherein the axis of the first fuel injection gun, the axis of the second fuel injection gun, the axis of the third fuel injection gun and the axis of the fourth fuel injection gun are located on the same plane.

3. The opposed-injection aluminum melting furnace uniform combustion system according to claim 1, wherein when the first heat storage unit works under heat storing state, the first port of the first heat storage unit serves as a high-temperature flue gas inlet, the second port of the first heat storage unit serves as a low-temperature flue gas outlet, and the at least two third ports of the first heat storage unit are closed;

when the second heat storage unit works under heat releasing state, the at least two third ports of the second heat storage unit serve as the low-temperature air inlet, the first port of the second heat storage unit serves as the high-temperature air outlet, and the second port of the second heat storage unit is closed;

the first fuel injection gun and the second fuel injection gun inject gas into the chamber, and the third fuel injection gun and the fourth fuel injection gun are in the closed state.

4. The opposed-injection aluminum melting furnace uniform combustion system according to claim 1, wherein when the first heat storage unit works under heat releasing state, the at least two third ports of the first heat storage unit serve as low-temperature air inlets, the first port of the first heat storage unit serves a high-temperature air outlet, and the second port of the first heat storage unit is closed;

when the second heat storage unit works under heat storing state, the first port of the second heat storage unit serves as a high-temperature flue gas inlet, the second port of the second heat storage unit serves as a low-temperature flue gas outlet, and the at least two third ports of the second heat storage unit are closed;

the third fuel injection gun and the fourth fuel injection gun inject gas into the chamber and the first fuel injection gun and the second fuel injection gun are closed.

5. The opposed-injection aluminum melting furnace uniform combustion system according to claim 1, wherein an air distribution panel is disposed at a first distance from one side wall of the chamber and a first distance from the other side wall of the chamber, and the first distance is set to one tenth to one fifth of the chamber width.

6. The opposed-injection aluminum melting furnace uniform combustion system according to claim 5, wherein a row of center holes are provided along the longitudinal center line of the air distribution panel, with the row of center holes including at least six square holes; several rows of circular holes are disposed along the lateral direction of the air distribution panel from the row of center holes to both side edges, with each row of circular holes including at least six circular holes along the longitudinal direction of the air distribution panel.

7. The opposed-injection aluminum melting furnace uniform combustion system according to claim 6, wherein each row of circular holes is respectively alternated with the adjacent row of circular holes in lateral direction, the row of center holes is alternately arranged with the adjacent two rows of circular holes in lateral direction.

8. The opposed-injection aluminum melting furnace uniform combustion system according to claim 1, wherein a first gas pipeline that passes transversely through the inner cavity of the heat exchange chamber is provided in the heat exchange chamber of the heat exchange device of the first heat storage unit, with the two ends of the first gas pipeline disposed with a first inlet port and a first outlet port, the first inlet port is provided with a control valve, and the first outlet port is connected with the inlet of the first fuel injection gun and the inlet of the second fuel injection gun through pipes;

a second gas pipeline that passes transversely through the inner cavity of the heat exchange chamber is provided in the heat exchange chamber of the heat exchange device of the second heat storage unit, with the two ends of the second gas pipeline disposed with a second inlet port and, a second outlet port, the second inlet port is provided with a control valve, and the second outlet port is connected with the inlet of the third fuel injection gun and the inlet of the fourth fuel injection gun through pipes.

9. The opposed-injection aluminum melting furnace uniform combustion system according to claim 8, wherein the first gas pipeline includes at least three first gas branch pipes, each first gas branch pipe of each first gas pipeline is connected with the first inlet port of the first gas pipeline and the first outlet port of the first gas pipeline on two ends thereof;

the second gas pipeline includes at least three second gas branch pipes, each second gas branch pipe of each second gas pipeline is connected with the second inlet port of the second gas pipeline and the second outlet port of the second gas pipeline on two ends thereof.

\* \* \* \* \*